(12) United States Patent
Rodriguez

(10) Patent No.: US 9,923,488 B2
(45) Date of Patent: Mar. 20, 2018

(54) SOFT SWITCHING TECHNIQUE FOR A GRID-TIED INVERTER

(71) Applicant: SunPower Corporation, San Jose, CA (US)

(72) Inventor: Fernando Rodriguez, Austin, TX (US)

(73) Assignee: SunPower Corporation, San Jose, CA (US)

( * ) Notice: Subject to any disclaimer, the term of this patent is extended or adjusted under 35 U.S.C. 154(b) by 10 days.

(21) Appl. No.: 15/080,948

(22) Filed: Mar. 25, 2016

(65) Prior Publication Data

US 2017/0279375 A1 Sep. 28, 2017

(51) Int. Cl.
  *H02M 7/5387* (2007.01)
  *H02J 3/38* (2006.01)
  *H02M 7/537* (2006.01)
  *H02M 7/48* (2007.01)

(52) U.S. Cl.
  CPC ........... *H02M 7/5387* (2013.01); *H02J 3/383* (2013.01); *H02M 7/537* (2013.01); *H02M 7/48* (2013.01)

(58) Field of Classification Search
  CPC ............ H02M 5/40; H02M 5/42; H02M 5/44; H02M 5/453; H02M 5/45; H02M 2007/4822; H02M 2007/4803; H02M 7/42; H02M 7/44; H02M 7/48; H02M 7/497; H02M 7/501; H02M 7/487; H02M 7/493; H02M 7/4826; H02M 7/49; H02M 7/4807
  USPC .......................... 363/15–17, 21.1, 39–41, 55
  See application file for complete search history.

(56) References Cited

U.S. PATENT DOCUMENTS

2014/0368141 A1* 12/2014 Zheng .................... H02P 29/10
                                                                  318/400.14
2017/0070163 A1* 3/2017 Pahlevaninezhad
                                                        ........................... H02M 7/5387

* cited by examiner

*Primary Examiner* — Timothy J Dole
*Assistant Examiner* — Bryan R Perez
(74) *Attorney, Agent, or Firm* — Grasso PLLC

(57) ABSTRACT

A method, system, and computer-readable medium facilitate a soft switching technique for operating an inverter. In a full bridge inverter, a one of first set of transistors in the inverter may be rapidly activated and deactivated in pulses while one of a second set of transistor may be activated during a switching time period where the inverter matches the voltage and frequency of an AC grid. During a blanking time period between switching time periods, one of the second set of transistors may be primed before the other is activated during the next switching time period to prevent generating noise in the AC output of the inverter due to a hard switch.

20 Claims, 8 Drawing Sheets

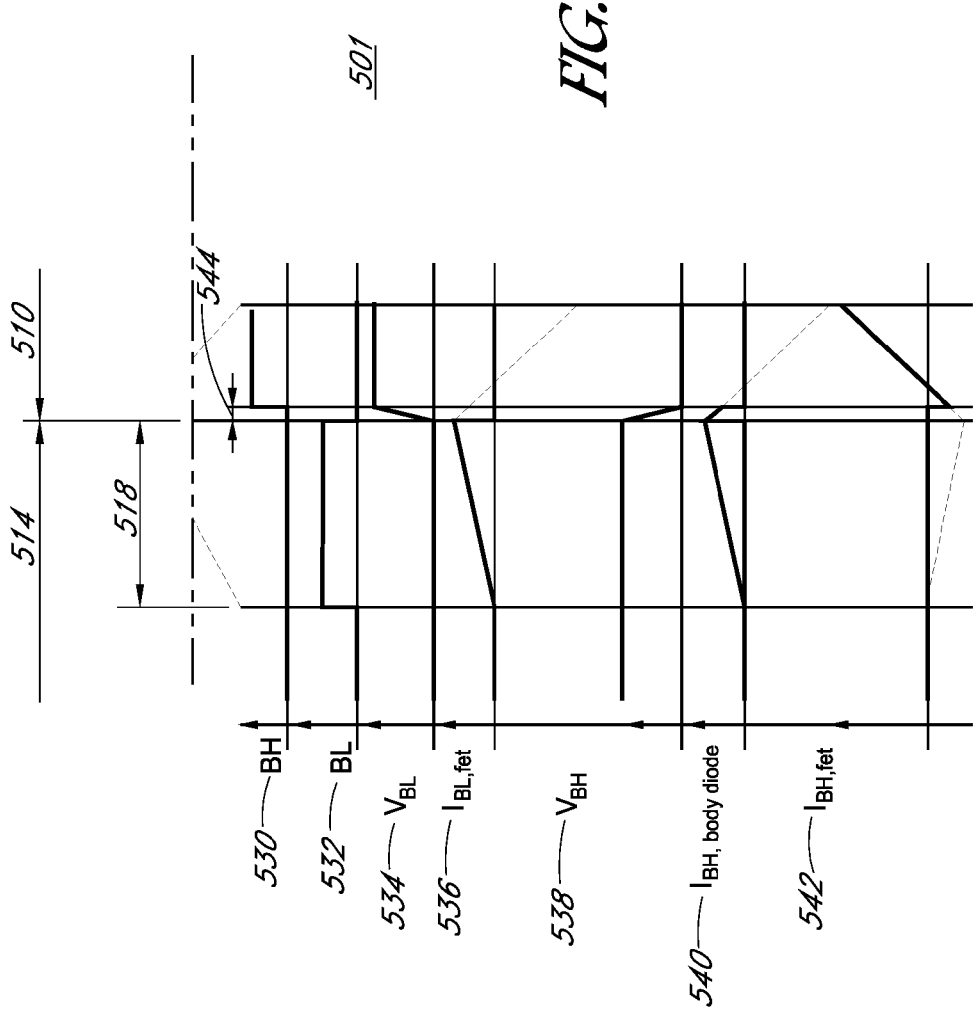

SOFT SWITCHING TECHNIQUE FOR A GRID-TIED INVERTER

BACKGROUND

Power inverters convert a DC power to an AC power. For example, some power inverters are configured to convert the DC power to an AC power suitable for supplying energy to an AC grid and, in some cases, an AC load coupled to the AC grid. One particular application for such power inverters is the conversion of DC power generated by an alternative energy source, such as photovoltaic cells ("PV cells" or "solar cells"), fuel cells, DC wind turbines, DC water turbines, and other DC power sources, to a single-phase AC power for delivery to the AC grid at the grid frequency.

In photovoltaic applications, the power delivered by each photovoltaic cell may vary in magnitude over time due to temporal variations in operating conditions including changes in sunlight intensity, angle of incidence of sunlight, ambient temperature and other factors. As such, photovoltaic cells have an operating point at which the values of the current and voltage of the cell result in an ideal or "maximum" power output. This "maximum power point" ("MPP") is a function of environmental variables, including light intensity and temperature. Inverters for photovoltaic systems may include some form of maximum power point tracking ("MPPT") as a mechanism of identifying and tracking the maximum power point ("MPP") and adjusting the inverter to exploit the full power capacity of the cell at the MPP.

Additionally, in a typical photovoltaic power system, an inverter may be associated with one or more solar cell modules. For example, some systems include strings of solar cell modules that deliver a relatively high, combined voltage (e.g., nominal 450 V) to a single, large inverter. Alternatively, in other systems such as a distributed photovoltaic power system, an inverter may be associated with each solar cell module. In such systems, the solar cell modules are typically small, relatively low voltage (e.g., 25 V). The inverter may be placed in close proximity to the associated solar cell module to increase the conversion efficiency of the overall system.

Typical photovoltaic inverters include an inverter circuit for converting DC power to AC power and a controller for controlling the functionality of the inverter circuit. Some inverter circuits include an input stage and an output stage. Typical inverter controllers are embodied as single stage controllers. That is, a single inverter controller controls both the input stage and the output stage of the inverter circuit. It may also be beneficial for a photovoltaic inverter connected to an AC grid to reduce noise in its output by filtering (active and/or passive) the noise that is generated and by preventing other noise from being generated.

BRIEF DESCRIPTION OF THE DRAWINGS

The figures described below depict various aspects of the systems and methods disclosed herein. It should be understood that each figure depicts an embodiment of a particular aspect of the disclosed systems, and that each of the figures is intended to accord with a possible embodiment thereof. Further, wherever possible, the following description refers to the reference numerals included in the following figures, in which features depicted in multiple figures are designated with consistent reference numerals.

FIG. 5B is a zoomed-in section of the timing and waveform diagram of FIG. 5A;

SUMMARY

Figure 1:
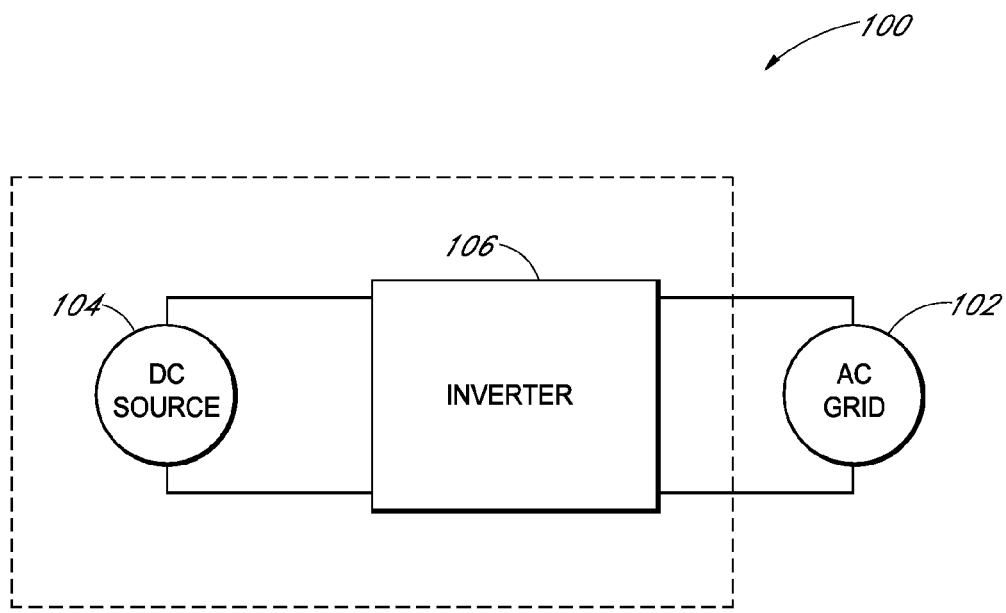
FIG. 1 is a simplified block diagram of a system for converting DC power to AC power in accordance with the presently disclosed embodiments.

In an embodiment, a method for controlling a full-bridge inverter includes receiving a direct current voltage; receiving an alternating current grid voltage that oscillates at a grid frequency; during a first switching time period when the alternating current grid voltage is positive, pulsing a first transistor AH at a pulse frequency and activating a second transistor BL; at the beginning of a first blanking time period after the first switching time period, ceasing to pulse the first transistor AH and deactivating the second transistor BL; during a first priming time period during the first blanking time period, activating the second transistor BL for a first priming time period and then deactivating the second transistor BL at the end of the first blanking time period; and during a second switching time period when the alternating current grid voltage is negative, pulsing a third transistor AL at the pulse frequency and activating a fourth transistor BH.

In another embodiment, an inverter includes a first transistor AH; a second transistor BL; a third transistor AL; a fourth transistor BH; and an inverter controller including: a processor; a memory storing computer-readable instructions that when executed by the processor cause the inverter to: receive a direct current voltage; receive an alternating current grid voltage that oscillates at a grid frequency; during a first switching time period when the alternating current grid voltage is positive, pulse the first transistor AH at a pulse frequency and active the second transistor BL; at the beginning of a first blanking time period after the first switching time period, cease to pulse the first transistor AH and deactivate the second transistor BL; during a first priming time period during the first blanking time period, activate the second transistor BL for a first priming time period and then deactivate the second transistor BL at the end of the first blanking time period; and during a second switching time period when the alternating current grid voltage is negative, pulse the third transistor AL at the pulse frequency and activate the fourth transistor BH.

In still another embodiment, a non-transitory, computer-readable medium stores instructions thereon that when executed by a processor of an inverter cause the inverter to receive a direct current voltage from a plurality of solar cells; receive an alternating current grid voltage that oscillates at a grid frequency; during a first switching time period when the alternating current grid voltage is positive, pulse the first transistor AH at a pulse frequency and active the second transistor BL; at the beginning of a first blanking time period after the first switching time period, cease to pulse the first transistor AH and deactivate the second transistor BL; during a first priming time period during the first blanking time period, activate the second transistor BL for a first priming time period and then deactivate the second transistor BL at the end of the first blanking time period; and during a second switching time period when the alternating current grid voltage is negative, pulse the third transistor AL at the pulse frequency and activate the fourth transistor BH.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" transistor does not necessarily imply that this transistor is the first transistor in a sequence; instead the term "first" is used to differentiate this transistor from another transistor (e.g., a "second" transistor).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

This specification first describes high-level descriptions of a DC to AC inverter, followed by a more detailed explanation of the output converter of a DC to AC inverter. The specification then includes a timing and waveform diagram showing the signaling used to operate the output converter in accordance with the disclosed embodiments and oscilloscope screenshots showing the voltage response of the output stage. The specification then includes a description of an example method for performing the soft switching scheme disclosed here.

Referring now to FIG. 1, a system 100 for supplying alternating current (hereinafter "AC") power to an AC grid 102 at a grid frequency includes a direct current (hereinafter "DC") source 104 and an inverter 106. The DC source 104 may be embodied as any type of DC source configured to generate or produce a DC power, which is supplied to the inverter 106. For example, the DC source 104 may be embodied as a photovoltaic solar cell or array, a fuel cell, a wind turbine configured to generate a DC power (e.g., via a rectifying circuit), a water turbine configured to generate a DC power, or other unipolar power source.

The inverter 106 is electrically connected to the DC source 104 and configured to convert a DC waveform generated by the DC source 104 to an AC waveform suitable for delivery to the AC grid 102 and, in some embodiments, loads coupled to the AC grid 102. The AC grid 102 may be embodied as, for example, a utility power grid that supplies utility AC power to residential and commercial users. Such utility power grids may be characterized as having an essentially sinusoidal bipolar voltage at a fixed grid frequency (e. g., f=co/2n=50 Hz or 60 Hz).

Figure 2:
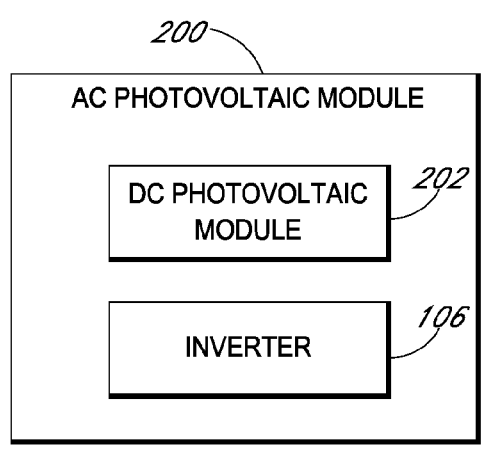
FIG. 2 is a simplified block diagram one embodiment of an AC photovoltaic module of the system of FIG. 1 in accordance with the presently disclosed embodiments.

As discussed above, in some embodiments, the DC source 104 may be embodied as one or more photovoltaic cells. In such embodiments, the DC source 104 and the inverter 106 may be associated with each other so as to embody an AC photovoltaic module (ACPV) 200 as illustrated in FIG. 2. The ACPV 200 includes a DC photovoltaic module (DCPV) 202, which operates as the DC source 104, electrically coupled to the inverter 106. The DCPV 202 includes one or more photovoltaic cells and is configured to deliver a DC waveform to the inverter 106 in response to receiving an amount of sunlight. The DC power delivered by the ACPV 200 is a function of environmental variables, such as, e.g., sunlight intensity, sunlight angle of incidence and temperature. In some embodiments, the inverter 106 is positioned in a housing of the ACPV 200. Alternatively, the inverter 106 may include its own housing secured to the housing of the ACPV 200. Additionally, in some embodiments, the inverter 106 is separate from the housing, but located near the DCPV 202 (e.g., installed on a rail securing the ACPV 200 to a mounting surface such as a roof). As discussed above, the inverter 106 is configured to convert the DC power received from the DCPV 202 to an AC power suitable for delivery to the AC grid 102 at the grid frequency. It should be appreciated that multiple ACPVs 200 may be used to form a solar array with each ACPV 200 having a dedicated inverter 106.

Figure 3:
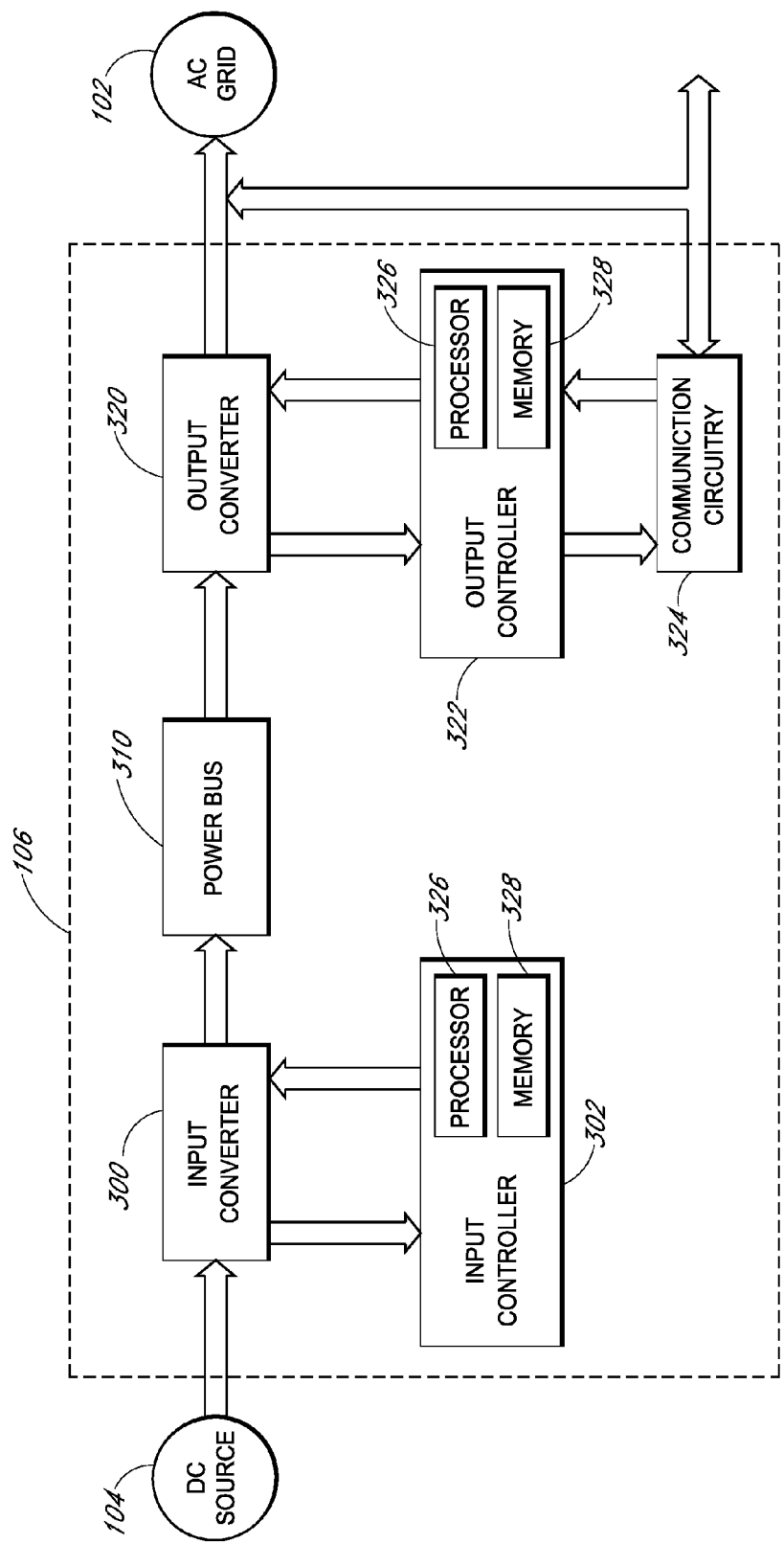
FIG. 3 is a simplified block diagram of an inverter of the system of FIG. 1 in accordance with the presently disclosed embodiments.

Referring now to FIG. 3, in an embodiment, the inverter 106 includes an input converter 300, a power bus 310, and an output converter 320. The input converter 300 is electrically coupled to the power bus 310 and is electrically couplable to the DC source 104 as shown in FIG. 3. Similarly, the output converter 320 is electrically coupled to the power bus 310 and electrically couplable to the AC grid 102. The inverter 106 also includes an input controller 302 and an output controller 322. It should be appreciated that the output controller 322 is separate from the input controller 302. That is, although the controllers 302, 322 may be housed in a single housing, the circuitry of the controllers 302, 322 are separate from each other. For example, the input controller 302 and the output controller 322 may be implanted on separate, individual semiconductor chips or the like. The input controller 302 and output controller 322 may include a processor 326 and a memory 328, both of which may be integrated into a single integrated circuit or as separate integrated circuits connected via wires on a printed circuit board. The processor 326 may execute instructions stored on the memory 328 and cause the input controller 302 or output controller 322 to perform various actions to control the input convert 300 or output converter 320, respectively. The memory 328 may be any of a number of known tangible storage mediums (e.g., RAM, DRAM, SRAM, ROM, EEPROM, Flash memory, etc.). Additionally, as discussed in more detail below, it should be appreciated that the input controller 302 and the output controller 322 are galvanically isolated from each other. Further, it should be appreciated that such separation and isolation between the controllers 302, 322 may lower the overall output noise of the inverter 106.

Because the controllers 302, 322 are separated and isolated from each other as discussed above, the controllers 302, 322 may be incapable of direct communications between each other. That is, the controllers 302, 322 may be incapable of directly communicating from one controller 302, 322 to the other controller 302, 322 without the use of intervening devices or circuitry. However, in some embodiments as discussed below, the controllers 302, 322 may be configured to communicate with each over the power bus 310. For example, the input controller 302 may be configured to modulate data onto the waveform of the power bus 310, which is subsequently demodulated by the output controller 322.

Additionally, in some embodiments, the inverter 106 may include communication circuitry 324. The communication circuitry 324 may be communicatively coupled to the output controller 322 or may be incorporated therein in some embodiments. The output controller 322 may utilize the communication circuitry 324 to communicate with remote devices, such as remote controllers or servers. In one particular embodiment, the communication circuitry 324 is embodied as a power line communication circuit configured to communicate with remote devices over an AC power line, such as the AC power line interconnects coupled to the output of the output converter 320. However, in other embodiments, other communication technologies and/or protocols may be used. For example, in some embodiments, the communication circuitry 324 may be embodied as a wireless or wired communication circuit configured to communicate with remote devices utilizing one or more wireless or wired communication technologies and/or protocols such as Wi-Fi™, Zigbee®, ModBus®, WiMAX, Wireless USB, Bluetooth®, TCP/IP, USB, CAN-bus, HomePNA™, and/or other wired or wireless communication technology and/or protocol.

In use, the input converter 300 of the inverter 106 is configured to be electrically coupled to the DC source 104 to receive a DC waveform therefrom. The input converter 300 converts the DC waveform to a bus waveform, which in the illustrative embodiment is a DC waveform but may be an AC waveform in other embodiments. Similarly, the output converter 320 is configured to be electrically coupled to the AC grid 102 and convert the bus waveform (i.e., either a DC waveform or an AC waveform) to the output AC waveform at the grid frequency for delivery to the AC grid 102.

As discussed above, the input controller 302 is electrically coupled to the input converter 300 and configured to control the operation of the input converter 300 to convert the input DC waveform from the DC source 104 to a bus waveform (e.g., a DC bus waveform) at the power bus 310. To do so, the input controller 302 may provide a plurality of switching and/or control signals to various circuits of the input converter 300 as described in more detail below. Additionally, as discussed below, the input controller 302 may control the operation of the input converter 300 based on a maximum power point tracking ("MPPT") algorithm or methodology.

The output controller 322 is electrically coupled to the output converter 320 and configured to control the operation of the output converter 320 to convert the bus waveform to the output AC waveform suitable for delivery to the AC grid 102. In the illustrative embodiment as discussed in more detail below, the output controller 322 is configured to use a pulse width modulation algorithm to control the output converter 320 such that the output AC waveform is pulse width modulated. To do so, the output controller 322 may provide a plurality of switching and/or control signals to various circuits of the output converter 320 as described in more detail below.

Figure 4:
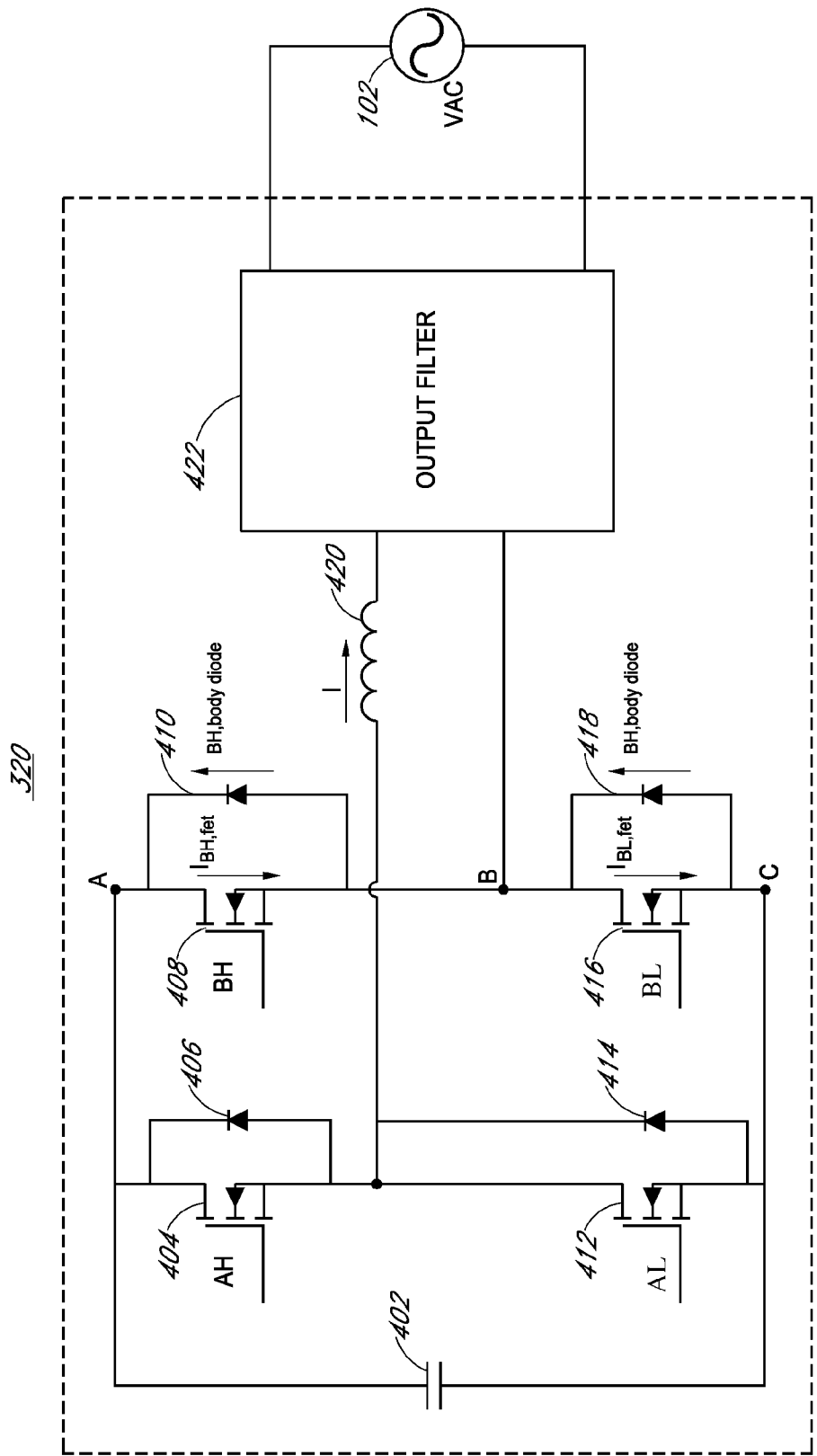
FIG. 4 is a simplified block diagram of an output converter of the inverter of FIG. 3 in accordance with the presently disclosed embodiments.

Referring now to FIG. 4, in the illustrated embodiment, the output converter 320 is embodied as a full-bridge AC to DC inverter with an output stage. The output converter 320 includes a voltage stabilization capacitor 402. The capacitor 402 is coupled to the power bus 310, and receives as input the voltage generated by the input converter 300. For example, the DC source 104 may be a solar cell module capable of generating a certain voltage (e.g., 42.9 volts, 57.3 volts, 72.9 volts, etc.) at maximum power and the input converter 300 may convert the voltage generated by the solar cell module to a higher voltage (e.g., 400 volts). In some embodiments, however, the DC source 104 may generate a higher voltage (e.g., 400 volts) directly without being transformed by an input converter 300, for example by use of a high voltage solar cell module. As discussed herein, the input converter 300 may convert the power from the DC source 104 to a bus waveform. This bus waveform energizes the capacitor 402, which stabilizes the bus waveform voltage for the output converter 320.

The output converter 320 further includes four transistors: a first transistor AH 404, a second transistor BH 408, a third transistor AL 412, and a fourth transistor BL 416. As discussed herein, the transistors AH 404 and AL 412 may be used to switch the output converter 320 periodically to use pulse width modulation to match the voltage and frequency of the AC grid 102 and may be pulsed at a frequency higher than the frequency of the AC grid 102. Further, this frequency may vary to adjust the operation of the output converter 320 in response to variance in voltage across capacitor 402 and/or variance in voltage of the AC grid 102. The transistors BH 408 and BL 416 may be used to switch the polarity of the input voltage to the output converter 320 to match the voltage polarity of the AC grid 102. Each transistor 404, 408, 412, and 416 may include a body diode: 406, 410, 414, and 418, respectively. The four transistors 404, 408, 412, and 416 are arranged in a full bridge configuration.

As shown in FIG. 4, four transistors 404, 408, 412, and 416 are MOSFETs, although other types of transistors may be used. In some MOSFETs, the source metallization may connect N and P doped regions on the top of the FET structure, forming a diode between the drain and the source of the MOSFET represented in FIG. 4 as body diodes 406, 410, 414, and 418. It will be understood, however, that it may be possible to build the output converter 320 using other types of transistors (e.g., bipolar junction transistors (BJT), insulated-gate bipolar transistors (IGBT), etc.) or thyristors. In such cases, the body diodes 406, 410, 414, and 418 may be separate from the transistors (or thyristors) 404, 408, 412, and 416. The control inputs (e.g., the gate terminals) of the transistors 404, 408, 412, and 416 may be coupled to the output controller 322, which in turn may provide control signals to the control inputs to allow current to flow through one or more of the transistors 404, 408, 412, and 416 or to stop current flow through one or more of the transistors 404, 408, 412, and 416 as discussed herein.

The output converter 320 may include an inductor 420, which may serve to stabilize the output current I to the output filter 422 and in turn the AC grid 102. The output filter 422 may include inductors, capacitors, and resistors arranged to smooth out the waveform of the output current I from a pulse width modulated triangular wave into a sinusoidal wave. FIG. 4 also includes three electrical Nodes labeled A (coupled to transistor AH 404 and transistor BH 408), B (coupled to transistor BH 408 and transistor BL 416), and C (coupled to transistor AL 412 and transistor BL 416). The common mode voltage of the output converter 320 (and the inverter 106 in general) may be determined by the change in voltage difference between Node A and Node B and the change in voltage difference between Node C and Node B. These changes in voltage difference may occur when one of transistor BH 408 or transistor BL 416 is activated at the beginning of a switching time period (e.g., switching time period 508, 510, 512, etc. discussed herein). As discussed herein, a "hard" switching of the transistors BH 408 and BL 416 may cause a rapid spike in common mode voltage (i.e., a relatively higher dv/dt), and this rapid spike in common mode voltage may introduce electrical noise in the inverter 106. Such noise would need to be filtered out before transmission to the AC grid 102, which would likely require additional hardware components (e.g., passive filter components like inductors and capacitors, active filter components such as transistors and control systems therefor). Alternatively, avoiding a hard switch by performing a "soft" switch will reduce or prevent the spike in common mode voltage and, as such, reduce or prevent the noise from ever being generated. The operation of the output converter 320 (and a "soft switching" technique to reduce the rate of change of common mode voltage) is discussed herein with reference to FIGS. 5A, 5B, 6A, 6B, and 7.

Figure 5A:
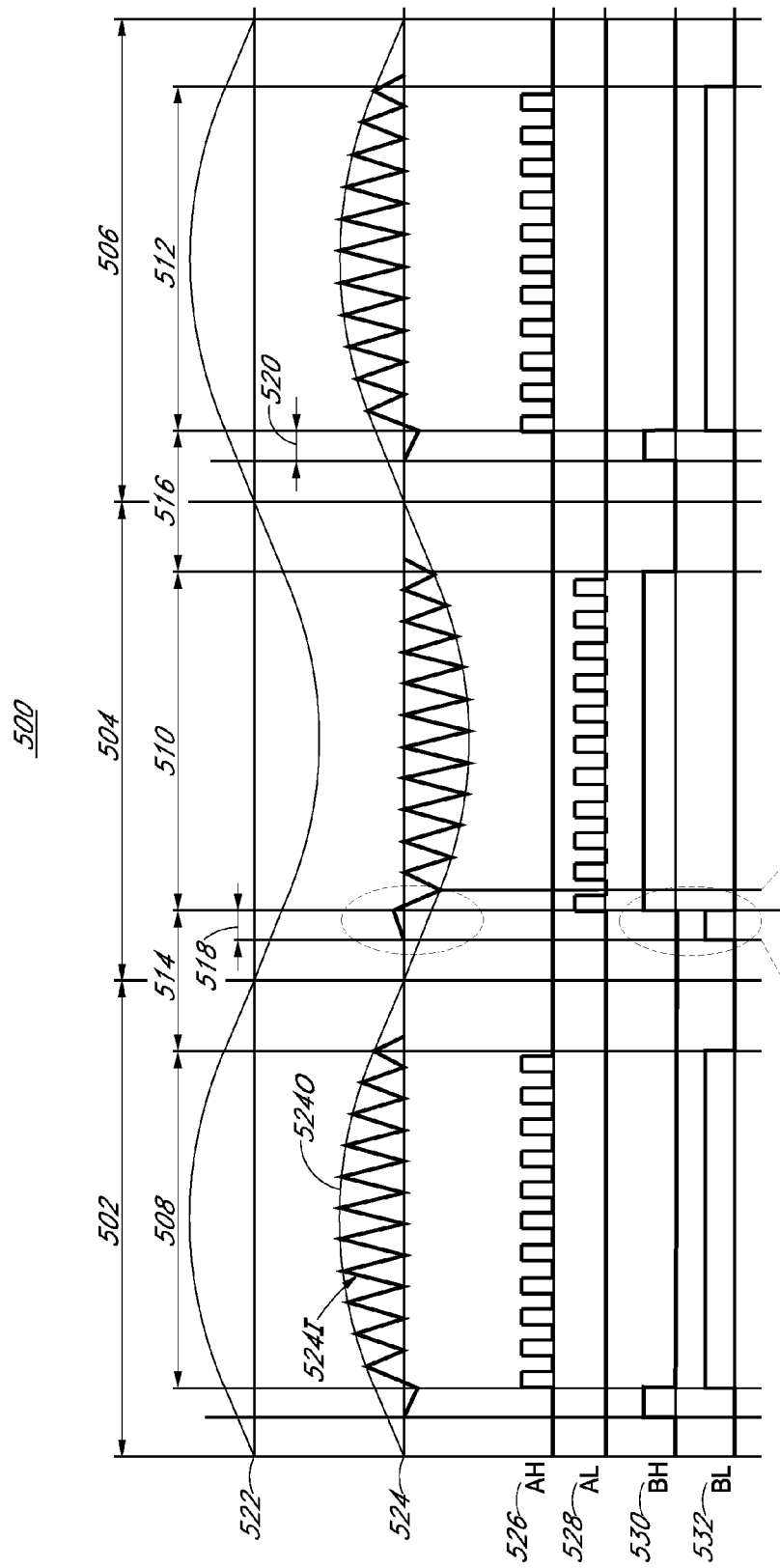
FIG. 5A is a timing and waveform diagram showing signals in the output converter of FIGS. 3 and 4 over one and a half cycles of an AC voltage on an AC grid in accordance with the presently disclosed embodiments.

Referring now to FIG. 5A, a timing and waveform diagram 500 is illustrated. FIG. 5A shows an AC grid voltage waveform 522 received from the AC grid 102. FIG. 5A shows three half cycles of the AC grid voltage waveform 522: a first half cycle 502, a second half cycle 504, and a third half cycle 506. As shown in FIG. 5A, the AC grid voltage waveform is positive in the first half cycle 502, negative in the second half cycle 504, and positive again in the third half cycle 506. It will be understood that the AC waveform 522 may continue for thousands or millions of cycles as long as the inverter 106 is coupled to the AC grid 102 and the AC grid 102 is operational.

FIG. 5A shows additional windows of time during which certain events occur. FIG. 5A includes a first switching time period 508, second switching time period 510, and a third switching time period 512, each a window of time during the first half cycle 502, second half cycle 504, and third half cycle 506, respectively. During the switching time periods 508, 510, and 512, the magnitude (or absolute value) of the AC grid voltage waveform is above a switching voltage threshold (e.g., 25 volts, although it will be understood that other voltage thresholds may be used). Because the AC grid voltage waveform 522 is a regular waveform, the magnitude of the AC grid voltage waveform 522 is above the switching voltage threshold for a certain amount of time each half cycle as shown in FIG. 5A. A first blanking time period 514 occurs between the first switching time period 508 and the second switching time period 510 starting when the magnitude of the AC grid voltage waveform 522 is below the switching voltage threshold (e.g., 25 volts) and ending when the magnitude of the AC grid voltage waveform 522 rises above an end blanking voltage threshold (e.g., 17 volts). Similarly, a second blanking time period 516 occurs between the second switching time period 508 and the third switching time period 510. Discussed herein, a first priming time period 518 occurs during the first blanking time period 514 and a second priming time period 520 occurs during the second blanking time period 516.

Output converter output waveform 524 illustrates the pulse width modulated voltage across the inductor 420 as the pulse width modulated triangular wave 5241 and the smoothed out waveform 5240. The smoothed out waveform 5240 may be the output of the output filter 422 to the AC grid 102 after the output filter 422 receives the voltage waveform across the inductor 420 (i.e., the pulse width modulated triangular wave 524l) and filters the voltage waveform across the inductor 420 (e.g., by passive filtering and/or active filtering).

Transistor pulse waveforms 526 and 528 illustrate the control signals sent by the output controller 322 to the transistor AH 404 and transistor AL 412, respectively. When received by the transistor AH 404, the control signal illustrated in transistor pulse waveform 526 causes the transistor AH 404 to rapidly activate (when the control signal is high) and deactivate (when the control signal is zero). Similarly, the control signal illustrated in transistor pulse waveform 528 causes the transistor AL 412 to rapidly activate (when the control signal is high) and deactivate (when the control signal is zero). As shown in FIG. 5, the transistor pulse waveform 526 causes the transistor AH 404 to rapidly activate and deactivate only during the first switching time period 508 and third switching time period 512 (i.e., when the AC grid voltage waveform 522 is positive and the magnitude is greater than the voltage threshold). Similarly, the transistor pulse waveform 528 causes the transistor AL 412 to rapidly activate and deactivate only during the second switching time period 510 (i.e., when the AC grid voltage waveform 522 is negative and the magnitude is greater than the voltage threshold). While the transistor pulse waveforms 526 and 528 illustrated in FIG. 5A show eleven pulses during each respective switching time periods 508, 510, and 512, it will be understood that the frequency may be higher or lower. In some embodiments, the frequency of the transistor pulse waveforms 526 and 528 may vary during each respective switching time periods 508, 510, and 512. It will be understood that the frequency of the transistor pulse waveforms 526 and 528 may be used to adjust the current across inductor 420 into the sinusoidal output converter output waveform 524. Further, the changing amplitude of the output converter output waveform 524 may help regulate the voltage across capacitor 402.

Switching period control waveforms 530 and 532 illustrate the control signals sent by the output controller 322 to the transistor BH 408 and transistor BL 416, respectively. When received by the transistor BH 408, the control signal illustrated in switching period control waveform 530 cause the transistor BH to activate (when the control signal is high) and deactivate (when the control signal is zero). Similarly, the control signal illustrated in switching period control waveform 530 causes the transistor BL 416 to activate (when the control signal is high) and deactivate (when the control signal is zero). As shown in FIG. 5, the switching period control waveform 530 causes the transistor BH 408 to be deactivated during the first switching time period 508 and third switching time period 512 and to be activated during the second switching time period 510. Similarly the switching period control waveform 530 causes the transistor BL 416 to be deactivated during the second switching time period 510 and to be activated during the first switching time period 508 and third switching time period 512. By activating and deactivating the transistors AH 404, BH 408, AL 412, and BL 416 during the switching time periods 508, 510, and 512 as disclosed herein, the polarity of the voltage input into the output filter 422 may be reversed and pulse width modulated to match the voltage and frequency of the AC grid 102. As will be understood, during the first switching time period 508 and third switching time period 512 current flows through the transistor AH 404 during the pulses causing the transistor AH 404 to be activated then to the inductor 420, output filter 422, and AC grid 102 and then back through the output filter 422 and through the transistor BL 416. Similarly, during the second switching time period 510, current flows from the transistor BH 408, output filter 422, AC grid 102, output filter 422 again, inductor 420, and transistor AL 412.

Figure 6A:
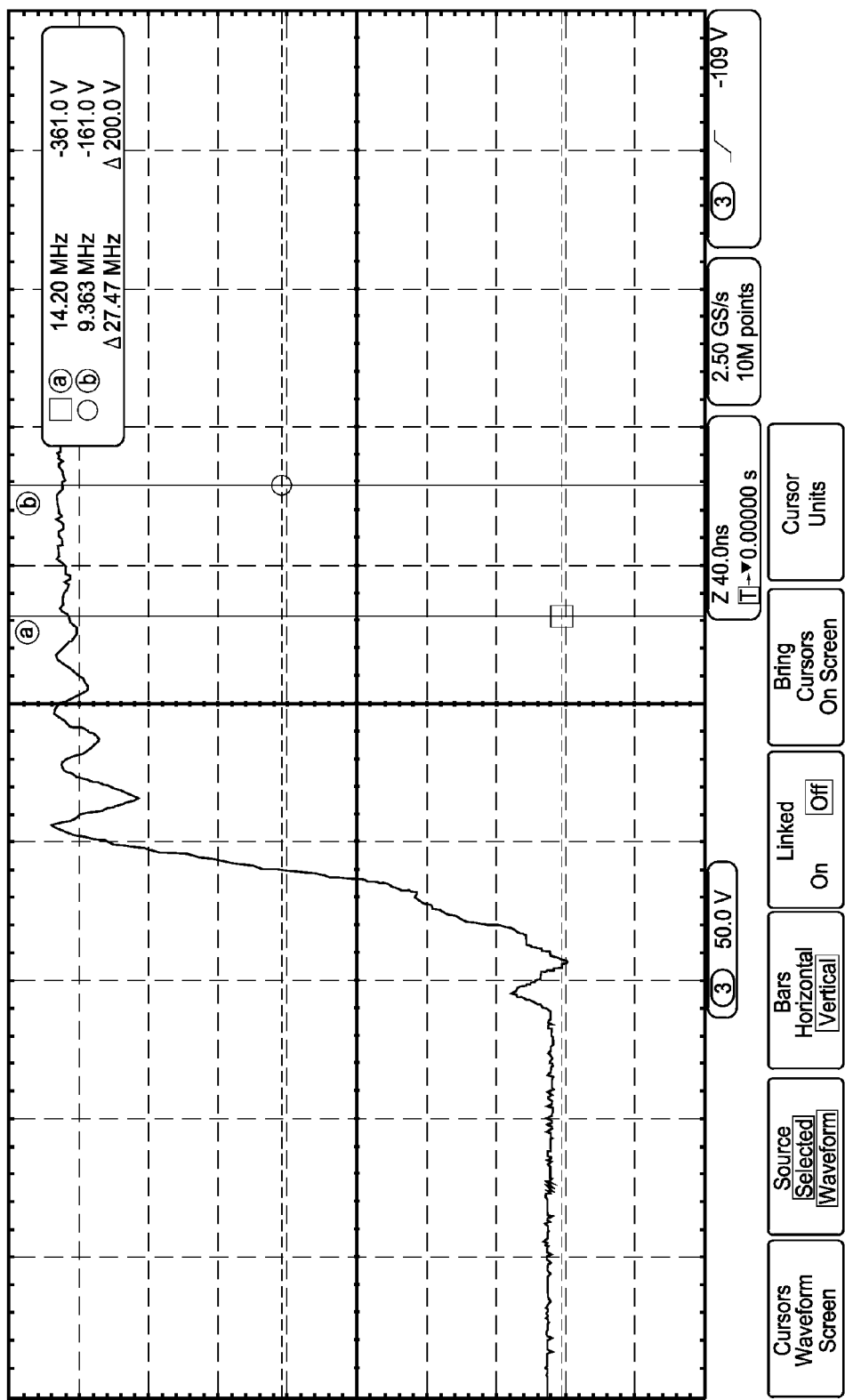
FIG. 6A is a representation of an oscilloscope screenshot showing the voltage across a transistor BH at the beginning of a switching time period when the transistor BH is not primed.

Additionally, switching period control waveforms 530 and 532 cause the transistors BH 408 and BL 416 to implement the soft switching technique disclosed herein. As discussed herein, when the magnitude of the AC grid voltage waveform 522 is less than the voltage threshold, a blanking time period 514 or 516 occurs. In a hard switching scheme, during the blanking time periods 514 and 516 none of the transistors 404, 408, 412, or 416 are activated. At the end of the blanking time periods 514 and 516, the appropriate transistors 404, 408, 412, and 416 would be activated or pulsed as discussed herein during the next switching time period. However, as a non-limiting example, it will be understood that activating the transistor BH 408 at the start of the second switching time period 512 will cause the voltage across transistor BL 416 to quickly increase from 0 volts to the input voltage to the output converter 320 (e.g., 400 volts). This quick increase in voltage (i.e., high dv/dt), however, may cause noise in the output converter output waveform 524 as discussed herein. Referring now to FIG. 6A, a representation of an oscilloscope screenshot 600 in which the transistor BH 408 was hard switched. Waveform 604 is a representation of the increasing voltage across transistor BL 416 at the beginning of the second switching time period 510. Waveform 604 shows an underdamped oscillation which quickly rises to the input voltage to the output converter 320 with significant overshoot. In the illustrated example, the voltage across transistor BL 416 rose to meet the input voltage to the output converter 320 in 30 nanoseconds. At the same time, the voltage across transistor BH 408 decreases from the input voltage to the output converter 320 (e.g., 400 volts) to 0 volts.

Instead of a hard switch, it may be advantageous to employ a soft switching technique to drive the voltage of the transistor BH 408 to close to 0 volts before activating the transistor BH 408 at the start of the second switching period. Referring now to FIG. 5B, detail 501 shows a zoomed-in view of the end of the first blanking time period 514, the first priming time period 518, and the beginning of the second switching time period 510. Detail 501 also includes illustrations of the voltage $V_{BL}$ 534 across transistor BL 416, the current $I_{BL,FET}$ 536 across the channel of transistor BL 416, the voltage $V_{BH}$ 538 across transistor BH 408, the current $I_{BH,BODY\ DIODE}$ 540 across the body diode 410, and the current $I_{BH,FET}$ 542 across transistor BH 408 during the time period highlighted in detail 501.

In the soft switching technique disclosed herein, at the end of the first blanking time period 514 before the first priming time period 518 both transistors BH 408 and BL 416 are deactivated. During the first priming time period 518, the transistor BL 416 is activated. In some embodiments, the first priming time period 518 may last a duration between 4 and 6 microseconds, although the period could be longer or shorter. After the first priming time period 518, there is a short dead time period 544 at the beginning of the second switching time period 510 (lasting about 350 nanoseconds, although the dead time period may be shorter or longer in duration) during which both transistors BH 408 and BL 416 are deactivated. After the dead time period 544, the transistor BH 408 is activated and the second time period 510 proceeds as discussed herein.

As shown in FIG. 5B, during the first priming time period 518 of the transistors 404, 408, 412, and 416 only transistor BL 416 is activated. It will be understood that during the first priming time period 518 when only transistor BL 416 is activated, the output converter 320 will draw current from the AC grid 102. Referring again to FIG. 4, because the AC grid voltage waveform 522 is negative during the first priming time period 518, current flows from the AC grid 102, to the output filter 422, through the channel of the transistor BL 416, through the body diode 414, through the inductor 420, back through the output filter 422 and back to the AC grid 102 to complete the circuit. During the first priming time period 518, the voltage across transistor BL 416, which is acting as a short, is shown as a low voltage $V_{BL}$ 534, and the voltage across transistor BH 408 is equal to the input voltage to the output converter 320 is shown as a high voltage $V_{BH}$ 538 in FIG. 5B. Additionally, during the first priming time period 518, the current through the channel of transistor BL 416 is increasing, shown as current $I_{BL,FET}$ 536, and the current through both the channel of transistor BH 408 and body diode 410 is zero, shown as current $I_{BH,FET}$ 542 and $I_{BH,BODY\ DIODE}$ 540, respectively. At the end of the first priming time period 518, the transistor BL 416 is deactivated.

During the dead time period 544 no transistors 404, 408, 412, and 416 are activated. It will be understood that inductors by their nature cannot change current instantaneously, so the current that was flowing from the inductor 420 to the output filter 422, AC grid 102, back through the output filter 422, and through the channel of the transistor BL 416 instead flows through the body diode 410, as shown by $I_{BH,BODY\ DIODE}$ 540. The current flowing through the body diode 410 causes the voltage across transistor BH 408 to be driven down to the forward voltage drop of the body diode 410, shown by the decreasing voltage $V_{BH}$ 538. The forward voltage drop of the body diode 410 is an inherent characteristic of the body diode 410 and may vary depending on the specific transistor BH 408 or model of transistor used, but in some embodiments the forward voltage drop of the body diode 410 is between 0.6 volts and 1 volt. It will be understood that the forward voltage drop of the body diode may be higher or lower. At the same time, the voltage across transistor BL 416 increases to match the difference between the voltage across capacitor 402 (e.g., 400 volts) and the voltage across transistor BH 408 as shown by voltage $V_{BL}$ 534. The rate of change in voltage during the dead time period 544 is substantially slower than the rate of change in voltage from a hard switch. Accordingly, this results in less ringing in the circuit of the output converter 320, a slower rising time of the voltage across transistor BL 416, and reduces the amount of overshoot to a negligible amount.

After the dead time period 544, transistor BH 408 is activated and transistor AL 412 is pulsed as discussed herein during the second switching time period 510. Because the voltage across the transistor BH 408 was already driven to the forward voltage drop across the body diode 410 (e.g., between 0.6 volts and 1 volt), the change in the voltage across the transistor BH 408 is much less than it would have been with a hard switch (e.g., change from 400 volts to 0 volts) when the voltage across the transistor BH 408 is driven to 0 volts when the transistor BH 408 is activated.

Figure 6B:
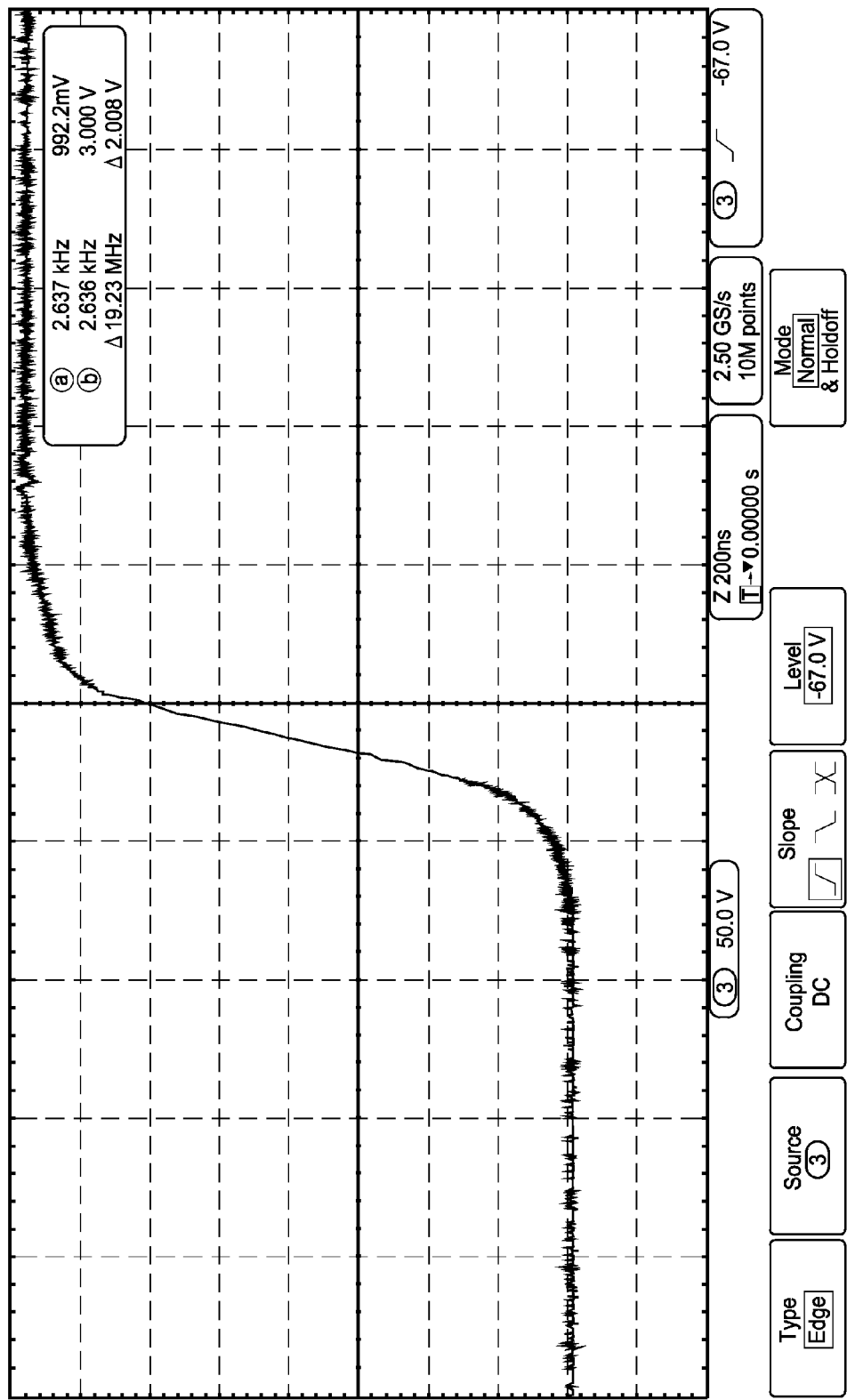
FIG. 6B is a representation of an oscilloscope screenshot showing the voltage across a transistor BH at the beginning of a switching time period when the transistor BH is primed in accordance with the presently disclosed embodiments.

Referring now to FIG. 6B, a representation of an oscilloscope screenshot 602 in which the transistor BL 416 was activated during the first priming time period 518 is shown. Waveform 606 is a representation of the increasing voltage across transistor BL 416 at the beginning of the second switching time period 510. Waveform 606 shows an overdamped oscillation (in some embodiments the oscillation may be critically damped) which more slowly rises to the input voltage to the output converter 320 without overshoot.

In some embodiments, the oscillation may be underdamped but with less overshoot and a slower rise time than the hard switching technique discussed above. In the illustrated example, the voltage across transistor BL 416 rose to meet the input voltage to the output converter 320 in 150 nanoseconds, about five times longer than the rise time of the hard switched scheme discussed herein. At the same time, the voltage across transistor BH 408 decreases from the forward voltage drop of the body diode 410 (e.g., between 0.6 volts to 1 volts) to 0 volts. The result is that the rate of change (i.e., dv/dt) in the common mode voltage is lower than it would be in a hard switching scheme, and therefore less noise is generated by the output converter 320.

It will be understood that similar to the soft switching scheme of activating transistor BL 416 during the first priming time period 518 before activating the transistor BH 408 during the second switching time period, the transistor BH 408 may be activated during the second priming time period 520 before activating the transistor BL 416 during the third switching time period with similar results: the transistor BL 416 may be driven to the forward voltage drop of the body diode 418. This soft switching of transistor BL 416 prevents a hard switch from the input voltage to the output converter 320 to 0 volts at the beginning of the third switching time period 512, which results in less noise being generated by the output converter 320.

Figure 7:
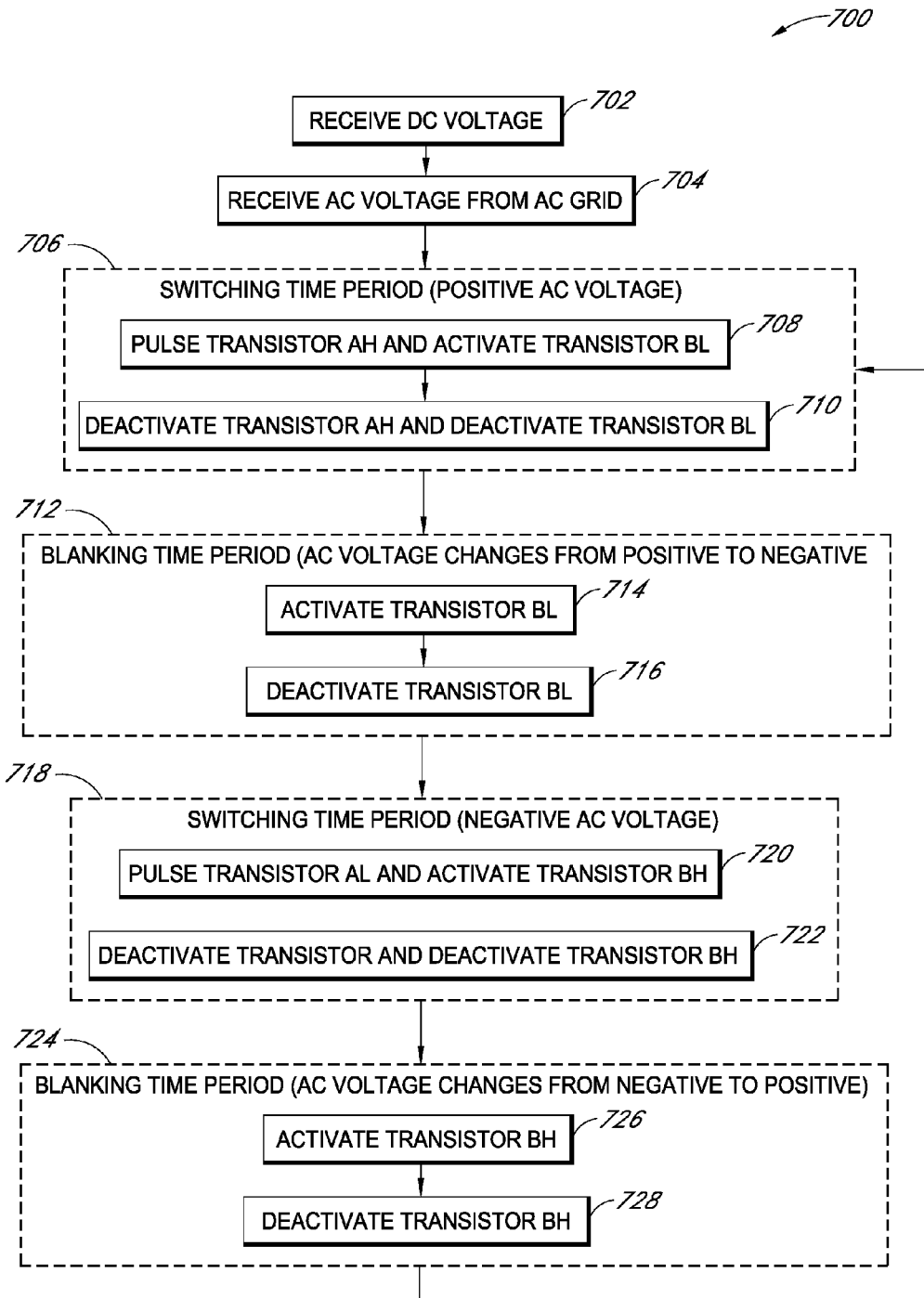
FIG. 7 depicts an example soft switching technique in accordance with the presently described embodiments.

Referring now to FIG. 7, a soft switching technique 700 for operating the output converter 320 is illustrated in a flowchart. At block 702, the output converter 320 receives a DC voltage (e.g., from an input converter 300 or directly from the DC source 104). At block 704, the output converter 320 receives an AC voltage from the AC grid 102. While blocks 702 and 704 are only illustrated once, the output converter 320 continuously receives DC voltage and AC voltage substantially continuously throughout the soft switching technique 700. Block 706 shows actions taken during a switching time period where the AC grid voltage is positive and the magnitude of the voltage is over a threshold (e.g., first switching time period 508, third switching time period 512). At block 708, the output controller 322 controls the output converter 320 to pulse the transistor AH 404 and activate transistor BL 416. At block 710, the output controller 322 controls the output converter 320 to deactivate the transistors AH 404 and BL 416. Block 712 shows action taken during a blanking time period where the AC grid voltage changes from positive to negative and the magnitude of the AC grid voltage is less than a threshold (e.g., first blanking time period 514). At block 714, the output controller 322 controls the output converter 320 to activate transistor BL 408 (e.g., the first priming time period 518). At block 716, the output controller 322 controls the output converter 320 to deactivate transistor BL 408.

Block 718 shows actions taken during a switching time period where the AC grid voltage is negative and the magnitude of the voltage is over a threshold (e.g., second switching time period 510). At block 720, the output controller 322 controls the output converter 320 to pulse the transistor AL 412 and activate transistor BH 408. At block 722, the output controller 322 controls the output converter 320 to deactivate the transistors AL 412 and BH 408. Block 724 shows action taken during a blanking time period where the AC grid voltage changes from negative to positive and the magnitude of the AC grid voltage is less than a threshold (e.g., second blanking time period 516). At block 726, the output controller 322 controls the output converter 320 to activate transistor BL 408 (e.g., the second priming time period 520). At block 728, the output controller 322 controls the output converter 320 to deactivate transistor BL 408. After block 726, the method 700 loops back to block 706 for the next switching time period.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for controlling a full-bridge inverter comprising:
   receiving a direct current voltage;
   receiving an alternating current grid voltage that oscillates at a grid frequency;
   during a first switching time period when the alternating current grid voltage is positive, pulsing a first transistor (AH) at a pulse frequency and activating a second transistor (BL);
   at the beginning of a first blanking time period after the first switching time period, ceasing to pulse the first transistor (AH) and deactivating the second transistor (BL);
   during a first priming time period during the first blanking time period, activating the second transistor (BL) for a first priming time period and then deactivating the second transistor (BL) at the end of the first blanking time period, wherein the second transistor (BL) is deactivated during the first blanking time period until the first priming time period; and
   during a second switching time period when the alternating current grid voltage is negative, pulsing a third transistor (AL) at the pulse frequency and activating a fourth transistor (BH).

2. The method of claim 1 further comprising:
   at the beginning of a second blanking time period after the second switching time period, ceasing to pulse the third transistor (AL) and deactivating the fourth transistor (BH);
   during a second priming time period during the second blanking time period, activating the fourth transistor (BH) for a first priming time period and then deactivating the second transistor (BL) at the end of the first blanking time period; and
   during a third switching time period when the alternating current grid voltage is positive, pulsing the first transistor (AH) at the pulse frequency and activating the second transistor (BL).

3. The method of claim 1 wherein the first priming time period is a between 4 and 6 µs in length.

4. The method of claim 1 wherein the alternating current grid voltage changes from positive to negative before the first priming time period.

5. The method of claim 1 wherein the fourth transistor (BH) includes a body diode and the voltage across the fourth transistor (BH) at the beginning of the second switching time period is the forward voltage drop of the body diode.

6. The method of claim 5 wherein the magnitude of the voltage across the fourth transistor (BH), a switching voltage rise time after the beginning of the second switching time period, is the magnitude of the direct current voltage.

7. The method of claim 6 wherein the switching voltage rise time is between 140 µs and 160 µs.

8. The method of claim 6 wherein during the switching voltage rise time the voltage across the fourth transistor (BH) does not exceed the direct current voltage.

9. An inverter comprising:
   a first transistor (AH);
   a second transistor (BL);
   a third transistor (AL);
   a fourth transistor (BH); and
   an inverter controller including:
   a processor;
   a memory storing computer-readable instructions that when executed by the processor cause the inverter to:
   receive a direct current voltage;
   receive an alternating current grid voltage that oscillates at a grid frequency;
   during a first switching time period when the alternating current grid voltage is positive, pulse the first transistor (AH) at a pulse frequency and active the second transistor (BL);
   at the beginning of a first blanking time period after the first switching time period, cease to pulse the first transistor (AH) and deactivate the second transistor (BL);
   during a first priming time period during the first blanking time period, activate the second transistor (BL) for a first priming time period and then deactivate the second transistor (BL) at the end of the first blanking time period, wherein the second transistor (BL) is deactivated during the first blanking time period until the first priming time period; and
   during a second switching time period when the alternating current grid voltage is negative, pulse the third transistor (AL) at the pulse frequency and activate the fourth transistor (BH).

10. The inverter of claim 9 wherein the memory storing computer-readable instructions that when executed by the processor cause the inverter to:
    at the beginning of a second blanking time period after the second switching time period, cease to pulse the third transistor (AL) and deactivate the fourth transistor (BH);
    during a second priming time period during the second blanking time period, activate the fourth transistor (BH) for a first priming time period and then deactivate the second transistor (BL) at the end of the first blanking time period; and
    during a third switching time period when the alternating current grid voltage is positive, pulse the first transistor (AH) at the pulse frequency and activate the second transistor (BL).

11. The inverter of claim 9 wherein the first priming time period is a between 4 and 6 microseconds in length.

12. The inverter of claim 9 wherein the fourth transistor (BH) includes a body diode and the voltage across the fourth transistor (BH) at the beginning of the second switching time period is the forward voltage drop of the body diode.

13. The inverter of claim 12 wherein the magnitude of the voltage across the fourth transistor (BH), a switching voltage rise time after the beginning of the second switching time period, is the magnitude of the direct current voltage.

14. The inverter of claim 13 wherein the switching voltage rise time is between 140 μs and 160 μs.

15. A non-transitory, computer-readable medium storing instructions thereon that when executed by a processor of an inverter cause the inverter to:
 receive a direct current voltage from a plurality of solar cells;
 receive an alternating current grid voltage that oscillates at a grid frequency;
 during a first switching time period when the alternating current grid voltage is positive, pulse the first transistor (AH) at a pulse frequency and active the second transistor (BL);
 at the beginning of a first blanking time period after the first switching time period, cease to pulse the first transistor (AH) and deactivate the second transistor (BL);
 during a first priming time period during the first blanking time period, activate the second transistor (BL) for a first priming time period and then deactivate the second transistor (BL) at the end of the first blanking time period, wherein the second transistor (BL) is deactivated during the first blanking time period until the first priming time period; and
 during a second switching time period when the alternating current grid voltage is negative, pulse the third transistor (AL) at the pulse frequency and activate the fourth transistor (BH).

16. The computer-readable medium of claim 15 storing instructions that when executed by the processor cause the inverter to:
 at the beginning of a second blanking time period after the second switching time period, cease to pulse the third transistor (AL) and deactivate the fourth transistor (BH);
 during a second priming time period during the second blanking time period, activate the fourth transistor (BH) for a first priming time period and then deactivate the second transistor (BH) at the end of the first blanking time period; and
 during a third switching time period when the alternating current grid voltage is positive, pulse the first transistor (AH) at the pulse frequency and activate the second transistor (BL).

17. The computer-readable medium of claim 15 wherein the first priming time period is a between 4 and 6 microseconds in length.

18. The computer-readable medium of claim 15 wherein the fourth transistor (BH) includes a body diode and the voltage across the fourth transistor (BH) at the beginning of the second switching time period is the forward voltage drop of the body diode.

19. The computer-readable medium of claim 18 wherein the magnitude of the voltage across the fourth transistor (BH) and switching voltage rise time after the beginning of the second switching time period is the magnitude of the direct current voltage.

20. The computer-readable medium of claim 19 wherein the switching voltage rise time is between 140 μs and 160 μs.

* * * * *